United States Patent Office 3,057,420
Patented Oct. 9, 1962

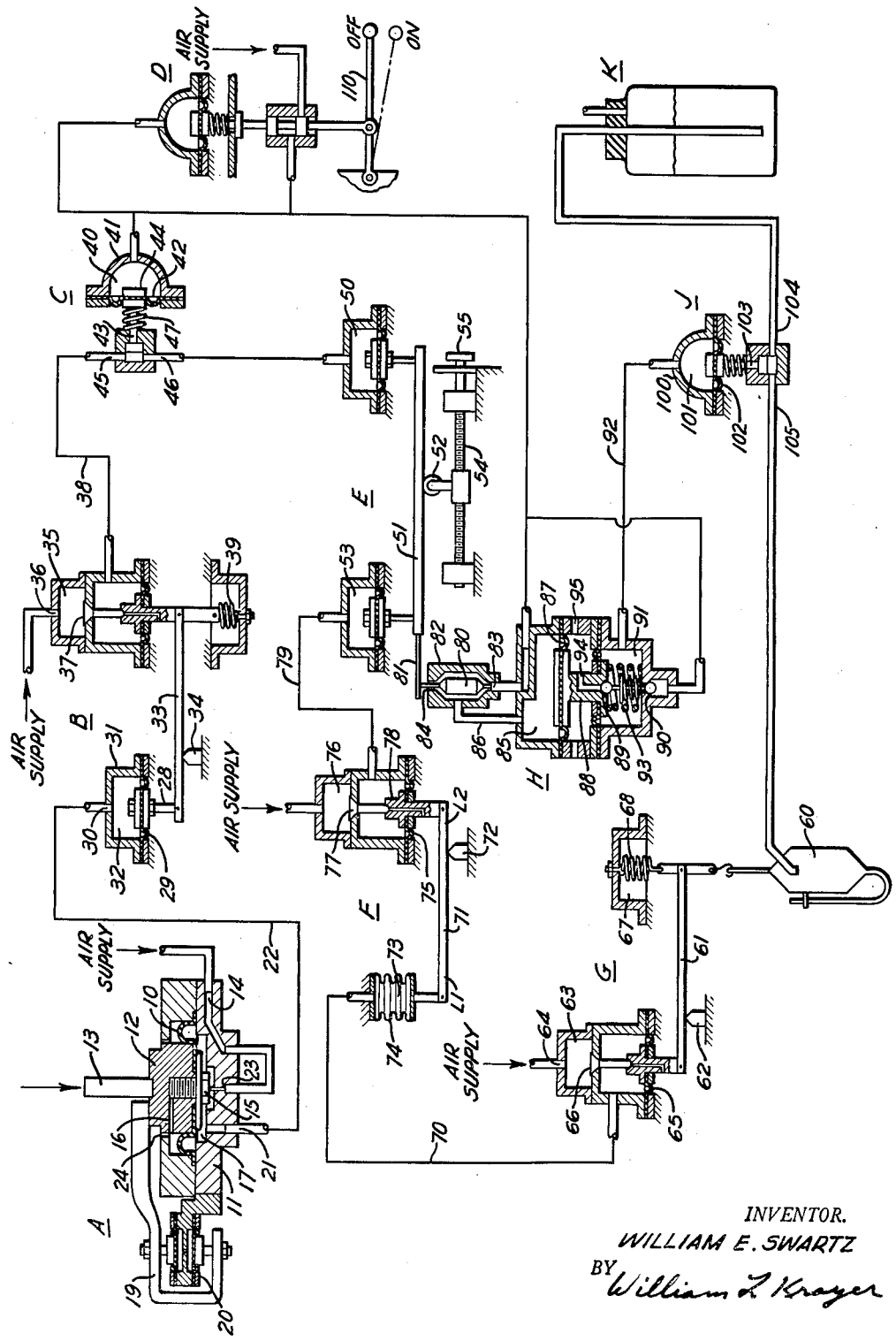

3,057,420
MEASURING DEVICE
William E. Swartz, McKeesport, Pa., assignor to Hagan Chemicals & Controls, Inc., Pittsburgh, Pa.
Filed Sept. 2, 1960, Ser. No. 53,827
1 Claim. (Cl. 177—30)

This invention relates to means for measuring small amounts of material in a desired proportion to a relatively large weight or force.

Recently the need has arisen for a highly accurate method of measuring rather small amounts of liquid, for example, in the neighborhood of a few milliliters, in proportion to relatively large weights such as 100 pounds to 2,000 pounds. For example, new methods of meat processing call for injections of enzymes, antibiotics, and the like prior to slaughter. Compositions such as natural enzymes which act as tenderizing agents need be present only in small amounts. It is essential to control accurately the amount injected, not only because of the cost of the chemical additive, but also for proper treatment of the meat. Generally, the apparatus should be capable of measuring about one milliliter of liquid for every 100 pounds of meat within a very few percent. Of course, the example of meat treatment is illustrative only. My invention can be used for any process or operation which requires measurement of a small amount of liquid or other material in a desired proportion to a relatively large weight.

The attached drawing is a more or less diagrammatic illustration of a preferred form of my invention. It includes a pneumatic circuit and pneumatic control components substantially as illustrated. Briefly, it comprises a large weight circuit, a small weight circuit, and a comparing and operating circuit. The large weight circuit develops a pneumatic pressure signal which is proportional to the weight of the large animal or object placed on the loading platform. This signal is amplified several times and transmitted to a comparing device. The small weight circuit develops a pneumatic pressure signal which is proportional to the weight of liquid flowing into a reservoir or other container, and transmits it to the comparing device. When the pressures in the comparing device are balanced, the flow of liquid is automatically cut off.

Referring again to the drawing, device A is a weighing device capable of accommodating a large weight, preferably in the range of about 1000–1500 pounds, and generating a pneumatic signal proportional thereto, preferably in the range of 0–30 pounds per square inch. It includes a diaphragm 10 affixed on its periphery to a stationary frame 11 and in its center to movable main thrust plate 12. Weight support 13 is affixed to the top of movable main thrust plate 12. An air supply connection 14 directs air to poppet valve 15, through inlet seat 23 to chamber 17 defined by the lower side of diaphragm 10 and stationary frame 11. Exhaust duct 16 begins at the upper end of poppet valve 15 and exits to atmosphere at space 24. Chamber 17, over diaphragm 10, is open to atmosphere through space 24. Yoke 19 supports damping device 20. The output pressure is delivered through output conduit 21. This preferred unit is a standard pneumatic control device known as the Hagan ThrusTorq, fully described in Bulletin MYP-707 of the manufacturer, Hagan Chemicals & Controls, Inc.

Operation of device A is as follows: An air supply of constant pressure is introduced through tube 14. When no force is applied through weight support 13 to movable main thrust plate 12, the air supply is completely blocked by poppet valve 15 at inlet seat 23. When a force is applied to the main thrust plate, the poppet valve is lowered and air is permitted to enter chamber 17. At the same time, exhaust duct 16 is opened at the top of poppet valve 23. A balance is reached whereby the pressure in chamber 17 is equivalent to the force exerted on weight support 13. The pressure in chamber 17 is extended through transmission line 22 to chamber 32 of device B.

The pressure signal from device A is sent through line 22 and received through port 30 in housing 31 of chamber 32 in device B. Device B is a ratio relay capable of amplifying the input signal and compensating for any constant error in the signal. It comprises a beam 33 having a fulcrum 34 and pneumatic chambers 32 and 35. The pressure introduced into chamber 32 is exerted on beam 33 through diaphragm 29 and stem 28 and balanced against the air supply pressure entering through port 36 of chamber 35 by the opening of poppet valve 37 which transmits the balancing, or output pressure through conduit 38. Spring 39 acting on the lower side of beam 33 is adjustable, thus providing means for varying the tare or other force to be subtracted. The signal relayed by device B is in the preferred form proportional to the large weight and in the range of 0–15 pounds per square inch. The preferred device is the ratio totalizer with tension spring attachment manufactured by Hagan Chemical & Controls, Inc. fully described in Bulletin MSP-120 of the manufacturer.

Device C is a normally closed pneumatically operated valve comprising chamber 40 defined by housing 41 and diaphragm 42. Stem 43, rigidly connected to diaphragm support 44, is constructed to cause communication between lines 45 and 46 when forced downward by a pressure in chamber 40 against spring 47. Any similar valve of this type, well known in the control art, may be substituted.

The signal from device B when permitted by valve C to pass into line 46 is received by device E in chamber 50. Device E is an adjustable fulcrum force balancing device. It comprises beam 51, roller fulcrum 52 and chambers 50 and 53, each similar in construction to chamber 32 of device B. Roller fulcrum 52 may be adjusted by turning screw 54 by handle 55. The effect of moving the fulcrum is, of course, to adjust the relative distances between it and the pressure chambers and thus change the ratio of balancing forces.

To this point, only the large weight circuit has been discussed.

The small weight circuit exerts a pressure in chamber 53 of device E which is preferably proportional to the weight of liquid or other material in receptacle 60.

Receptacle 60 is suspended from one arm of device G, which is a balancing weighing device for generating a pneumatic signal in proportion to the force acting on beam 61 on the left side of fulcrum 62. Air supply is introduced into chamber 63 through port 64. Diaphragm 65 and poppet valve 66 operate as in chamber 35 of device B. Chamber 67 is equipped with adjustable spring 68 for subtracting the weight of receptacle 60 or other tare. Thus, the output of chamber 63 through port 64 is directly proportional to the weight of the contents of receptacle 60 at any given moment. Operation of the balancing and signal generating device of chamber 63 is identical to that of chamber 35 of device B.

This signal is transmitted through line 70 to device F which is a ratio relay preferably having unequal arms L1 and L2 of beam 71, which rests on fulcrum 72. Chamber 73 is preferably a bellows 74 having an effective area somewhat larger than that of diaphragm 75 in chamber 76. The air supplied into chamber 76 tends to balance the force acting on the left side of the beam 71 by generating an output pressure proportional to it utilizing poppet valve 77 and diaphragm support 78 as described in connection with chamber 35 of device B.

The output of device F is sent through line 79 to chamber 53 of toggle relay E where it is balanced against the pressure in chamber 50 representing the large weight.

The comparing and operating circuit comprises devices E, H and J.

Device H is a toggle relay designed to exhaust the pressure in the air supply lines to valves J and C when the forces acting on device E are balanced. It comprises a valve 80 suspended from extension 81 of beam 51. It is constructed in housing 82 in such a way that at its highest point, inlet seat 83 for the air supply is wide open, and at its lowest point, inlet seat 83 is closed while exhaust port 84 is open. Raising valve 80 permits the full air supply pressure to enter chamber 85 through conduit 86. By means of diaphragm 87, member 88 is lowered which closes seat 89 and opens inlet seat 90. The air supply is thus permitted to enter chamber 91 and proceed through line 92 to valve J. Lowering valve 80 by means of a balancing pressure in chamber 53 closes off the air supply at inlet 83 and exhausts chamber 85 to atmosphere through port 84, which permits element 88 to be raised by spring 93, which shuts off the air supply at inlet 90 and opens valve seat 89, thus exhausting the pressure in chamber 91 to atmosphere through duct 94 and port 95. The toggle relay of Williams, U.S. Patent 2,829,858, is fully equivalent to device H for my purposes and may be substituted therefor, as may any device capable of performing its function.

Device J is a normally closed pneumatically operated valve. Its function is to start and cut off the flow of liquid from source K to receptacle 60. It comprises housing 100 defining chamber 101, diaphragm 102 and stem 103. It is constructed so that a pressure in chamber 101 will activate stem 103 to establish communication between lines 104 and 105.

Device K is a container or other source of the liquid to be measured. The preferred form is as shown, which, of course, should be kept higher than receptacle 60 at all times in order to be assured of uninterrupted flow.

Operation of the illustrated presently preferred form is as follows: The operator, after placing the large object on device A, moves handle 110 into the "On" position, which introduces a 60 pound air pressure into the operating circuit, opening valves C and J. Opening valve J, of course, starts the flow of liquid into receptacle 60. The signal of device A representing the large weight is amplified and relayed by device B through valve C to chamber 50 of balancing device E. The signal representing the weight of the liquid is transmitted from weighing device G to chamber 73 of ratio relay F. Ratio relay F generates an amplified signal proportional to that in chamber 74 and transmits it to chamber 53 of balancing device E. Liquid continues to flow until the two pressures in balancing device E are balanced. At that instant, valve 80 of device H is moved downward by the downward movement of the left side of beam 81, and the entire air supply line is exhausted to atmosphere as explained in the description of device H. This closes valve J which cuts off the flow of liquid at the instant the desired proportion of liquid is achieved.

The amount of liquid measured per unit of weight on device A may be varied by varying the position of fulcrum 52 of device E.

The tubes for transmitting the pneumatic pressures may be of any suitable material which can be attached to standard pneumatic components and will remain free and clear of internal dust, dirt, and the like. I prefer to use plastic tubing for its ease in handling.

The functions of the components described in the illustrations may, of course, be performed by similar components without departing from the spirit of the invention. For example, the large weight circuit may be comprised of any unit or units which will generate a pneumatic pressure proportional to a large weight. The small weight circuit may be comprised of any unit or units which will generate a pneumatic pressure proportional to a small weight. The comparing and operating circuit may be replaced by any unit or units capable of balancing the two pressures and shutting off the flow of liquid when the desired ratio is reached.

Obviously, the flow of granular, powdered, or other material into a container may be controlled by my invention as well as the flow of liquid.

It is to be distinctly understood that my invention is not limited to the preferred forms illustrated and described. My inventiion may be otherwise variously practiced within the scope of the following claim:

I claim:

Apparatus for measuring small amounts of liquid in desired relations to relatively large weights comprising:
(a) a weighing device having means for generating a pneumatic pressure directly proportional to a relatively large weight;
(b) a pneumatic ratio relay for receiving said pneumatic pressure and transmitting an attenuated pneumatic signal proportional to said pneumatic pressure, said ratio relay having tare means;
(c) a receptacle for liquid to be measured;
(d) means for introducing liquid into said receptacle;
(e) a pneumatic weighing device having tare means to subtract the weight of the receptacle for generating a small weight pressure signal proportional to the weight of the contents of said receptacle;
(f) a pneumatic ratio relay having diaphragm chambers and lever arms for generating a pneumatic signal proportional to said small weight signal; and
(g) balancing means for comparing the attenuated large weight pneumatic signal and the amplified small weight pneumatic signal and cutting off the flow of liquid into said receptacle when the two signals are balanced.

References Cited in the file of this patent

UNITED STATES PATENTS

| | | |
|---|---|---|
| Re. 24,969 | Golding | Apr. 18, 1961 |
| 1,851,542 | Hem | Mar. 29, 1902 |
| 2,854,714 | Dietert | Oct. 7, 1958 |
| 2,915,958 | Rice | Dec. 8, 1959 |